United States Patent
Kang et al.

(10) Patent No.: US 9,460,588 B1
(45) Date of Patent: Oct. 4, 2016

(54) METHODS FOR PRODUCING STATE-AGNOSTIC WAVEFORMS UPON MAGNETIC READING OF A UNIVERSAL COUNTER DEPOSIT TICKET

(71) Applicant: Bank of America Corporation, Charlotte, NC (US)

(72) Inventors: Sean B. Kang, McKinney, TX (US); Stephen D. Poinier, Corinth, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/953,564

(22) Filed: Nov. 30, 2015

(51) Int. Cl.
  *G07F 19/00* (2006.01)
  *G06K 19/06* (2006.01)

(52) U.S. Cl.
  CPC ....... *G07F 19/202* (2013.01); *G06K 19/06206* (2013.01)

(58) Field of Classification Search
  CPC ............... G06Q 20/04; G06Q 20/042; G06Q 20/0425; G06Q 20/10; G06Q 40/02
  USPC ........................................................ 235/379
  See application file for complete search history.

(56) References Cited

U.S. PATENT DOCUMENTS

| | | | | |
|---|---|---|---|---|
| 3,778,596 A * | 12/1973 | Wapner | ............... | G07D 11/0096 109/24.1 |
| 4,358,671 A | 11/1982 | Case | | |
| 5,422,468 A * | 6/1995 | Abecassis | ............... | G06Q 20/00 235/375 |
| D488,505 S | 4/2004 | Al Amri | | |
| 7,165,723 B2 | 1/2007 | McGlamery et al. | | |
| 7,546,261 B2 | 6/2009 | Bogosian et al. | | |
| 7,743,978 B1 * | 6/2010 | Huth | ...................... | G06Q 40/02 235/379 |
| 8,676,700 B2 * | 3/2014 | Holland | ................. | G06Q 40/02 235/379 |
| 9,305,181 B1 | 4/2016 | Watson, III et al. | | |
| 2002/0077971 A1 * | 6/2002 | Allred | ..................... | G06Q 20/04 705/39 |
| 2005/0086139 A1 * | 4/2005 | Blackman | .......... | G06Q 30/0215 705/35 |

OTHER PUBLICATIONS

"What is MICR," Altec, Laguna Hills, CA, Retrieved on Dec. 2, 2015.
"MICR Basics Handbook," Troy, Inc. Costa Mesa, CA, Oct. 8, 2004.
Vangie Beal, "MICR," webopedia.com, Retrieved on Nov. 1, 2015.
"Generic MICR Fundamentals Guide," Xerox Corporation, El Segundo, CA, Jan. 2003.

* cited by examiner

*Primary Examiner* — Seung Lee
(74) *Attorney, Agent, or Firm* — Weiss & Arons LLP; Michael A Springs, Esq.

(57) ABSTRACT

A state-agnostic counter deposit ticket is provided. The counter deposit ticket may include MICR ink. The MICR ink may be printed on a top face of the ticket. The MICR ink may include a universal routing transit number, which may be independent of any state of origin indication in the MICR ink. Waveforms may be produced from the MICR ink may include a positive indication of state-agnosticity. The counter deposit ticket may include a plurality of boxes on the top face on the ticket. Each box may include the name of one of the fifty states of the United States of America. The counter deposit ticket may outline a portion of empty space. The portion may be at least two inches by two inches square on a bottom face of the ticket, and designated by the legend "do not write in this area".

17 Claims, 16 Drawing Sheets

|   | Dollars /<br>Dólares | Cents /<br>Centavos |
|---|---|---|
| 1. | | |
| 2. | | |
| 3. | | |
| 4. | | |
| 5. | | |
| 6. | | |
| 7. | | |
| 8. | | |
| 9. | | |
| 10. | | |
| 11. | | |
| 12. | | |
| 13. | | |
| 14. | | |
| 15. | | |
| 16. | | |
| 17. | | |
| 18. | | |
| 19. | | |
| 20. | | |
| 21. | | |
| 22. | | |

$ ☐☐☐☐☐☐☐.☐☐

Enter This Total On The Front Of This Ticket
Anota este total al frente de este formulario

Out of State Counter Deposit — CREDIT

1. Verify the customer name and account number on-line.
2. Mark the State Code for the domicile state/entity of the account.
3. Write the 2-digit number in the Proof Code box below.

| 79 (FL) Florida | 58 (GA) Georgia | 86 (ID) Idaho | 81 (NY) New York | 35 (KS) Kansas | 88 (ME) Maine | 52 (MD) Maryland | 90 Customer Connection | 82 (AZ) Arizona | 36 (AR) Arkansas | 84 (CA) California | 76 (CT) Connecticut |
| 55 (NJ) New Jersey | 38 (NM) New Mexico | | 32 (IL) Illinois | 31 (IN) Indiana | 33 (IA) Iowa | | 77 (MA) Mass. | 30 (MI) Michigan | 34 (MO) Missouri | 87 (NV) Nevada | 61 (NH) New Hampshire |
| | | | 56 (NC) North Carolina | 37 (OK) Oklahoma | 97 (OR) Oregon | 39 (PA) Pennsylvania | 89 (RI) Rhode Island | 63 (TN) Tennessee | 74 (TX) Texas | 53 (VA) Virginia | 50 (DC) Washington DC | 99 (WA) Wash. State | 57 (SC) South Carolina |

Name _John Doe_ (Please Print)
Address _1 Main Rd_ (Please Print)
City/State/Zip _Anytown, New York_ (Please Print)

X _____ Telephone ( )

_SIGN HERE IF CASH RECEIVED FROM DEPOSIT_
Proof Code | Account Number
8 1 | 1 2 3 4 5 6 7 8 9 0 0 0

Date _5/5/15_
PLEASE COMPLETE ALL INFORMATION AND PRESENT IDENTIFICATION.
All items received subject to terms and conditions of applicable laws, regulations and deposit agreement.

Location/Store/Serial # (for Business customers only)

Cash ▲ 6 5 0 0 . 0 0
Checks ▲
Subtotal ▲ 
Less Cash ▲
Total Deposit $ 6 5 0 0 . 0 0

Deposits may not be available for immediate withdrawal.

Dollars / Dólares     Cents / Centavos

568

$ ☐☐☐☐☐☐☐.☐☐

Enter This Total On The Front Of This Ticket
Anota este total al frente de este formulario

566

Do not write in this area

03/26/2015 ************** ****
Acct# ******,        **********
Total Deposit To   CHK     $22,000.00
Credit Pending Posts on    03/26/2015
Available Now                   $0.00

IntRef#    ****************************

FIG. 5C

| | Dollars / Dólares | Cents / Centavos |
|---|---|---|
| 1. | | |
| 2. | | |
| 3. | | |
| 4. | | |
| 5. | | |
| 6. | | |
| 7. | | |
| 8. | | |
| 9. | | |
| 10. | | |

572

$ ☐☐☐☐☐☐☐.☐☐

Enter This Total On The Front Of This Ticket
Anota este total al frente de este formulario

576

Do not write in this area

METHODS FOR PRODUCING STATE-AGNOSTIC WAVEFORMS UPON MAGNETIC READING OF A UNIVERSAL COUNTER DEPOSIT TICKET

FIELD OF THE INVENTION

This invention relates to state-agnostic counter deposit tickets. More specifically, this invention relates to state-agnostic counter deposit tickets including MICR (magnetic ink character recognition) characters.

BACKGROUND OF THE INVENTION

Many times, individuals and/or entities receive checks and/or cash from individuals and/or entities. Sometimes, the receiving individuals and/or entities may deposit the checks and/or cash in a bank account. The deposit may be executed by a human teller. The deposit may also be executed by an ATM.

A depositor may be required to fill out a counter deposit ticket when making a deposit, as opposed to a customized deposit ticket. The counter deposit ticket may include lines and/or boxes. There may be text beside the lines and/or boxes which indicate where a depositor should write his or her personal account information. For example, the counter deposit ticket may include a line for the account holder's name, a line for the account holder's phone number, a line for the account holder's address and/or a line for the account number.

A counter deposit ticket may also include a MICR line on the ticket. The MICR line may include MICR characters printed in magnetic ink. The MICR line may include encoded information. The information may be used during the processing of the deposit.

Conventionally, the MICR line on a counter deposit ticket included state-specific information. For example, the MICR line on a counter deposit ticket used in Missouri may be different from the MICR line of a counter deposit ticket used in California. In addition, the state-specific counter deposit ticket must match the domicile state of a depositor's account. For example, a depositor whose domicile state is California may be required to use a California-MICR counter deposit ticket. The domicile state of the account holder may be a state in which the account holder resides. The domicile state of the account holder may be the state in which the account holder opened up his or her account.

Difficulties may arise when using state-specific counter deposit tickets. One of the difficulties may be when a depositor moves and did not change the domicile state associated with his or her bank account. The depositor may not know that the counter deposit ticket he or she is using is domicile-state-specific. He may then bring the filled-out ticket to the teller only to find out that he has to fill out another ticket (possibly, an out-of-state counter deposit ticket) because his bank account domicile state is elsewhere. This may frustrate depositors.

It may be desirable to have a universal MICR line on the counter deposit ticket which can be used across the entire United States of America or the entire world.

SUMMARY OF THE DISCLOSURE

A method for using a counter deposit ticket with a financial institution teller and/or an ATM is provided. The method may include printing, in MICR ink, on a top face of the counter deposit ticket, a universal routing transit number. The universal routing transit number is preferably independent of any state of origin indication in the MICR ink. The method may also include printing a plurality of boxes, on a top face of the ticket. The plurality may be greater than twenty-five. The plurality may be less than twenty-five. Each box may include the name of one of the fifty states of the United States of America. Each box may hold a state name distinct from the other twenty-four boxes.

The method may include outlining or circumscribing a portion on a bottom face of the ticket. The portion may circumscribe empty space. The portion may be at least two inches by two inches square. The portion may be designated by the legend "do not write in this area."

The method may include receiving the counter deposit ticket at a financial institution teller or ATM. The method may include scanning the completed counter deposit ticket by a reader/sorter. The method may include scanning the completed counter deposit ticket by an image scanner.

The method may include identifying, via the router/sorter, the universal routing transit number printed in MICR ink. The method may include, identifying, via a scanner using a magnetic ink ("MICR") reader, the universal routing transit number printed in MICR ink. The method may include, identifying, via a scanner using optical character recognition ("OCR") software, the universal routing transit number printed in MICR ink. The method may include identifying, via OCR software, an account number written on the counter deposit ticket. The method may include checking to ensure the account number identified matches an account number associated with a depositor. The method may include processing a deposit transaction associated with the counter deposit ticket.

The method may include transmitting a request to an account-state database. The request may include the account number associated with the deposit transaction. The method may also include receiving a response from the account-state database. The response may include the account number and a state of origin associated with the account number. The account-state database may be located at a different location from the reader/sorter and/or from the image scanner. The response may enable the ATM and/or teller to confirm the proper state of the account.

In some embodiments, the account number may be printed in MICR ink on the counter deposit ticket.

In some embodiments, the identifying may be performed by the image scanner.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 1A and 1B show a prior art counter deposit ticket;
FIGS. 2A and 2B show a prior art counter deposit ticket;
FIGS. 4A and 4B show a prior art counter deposit ticket;
FIGS. 5A, 5B, 5C, 5D, 5E, 5F and 5G show an exemplary embodiment of the invention.

DETAILED DESCRIPTION OF THE DISCLOSURE

Figure 1A:
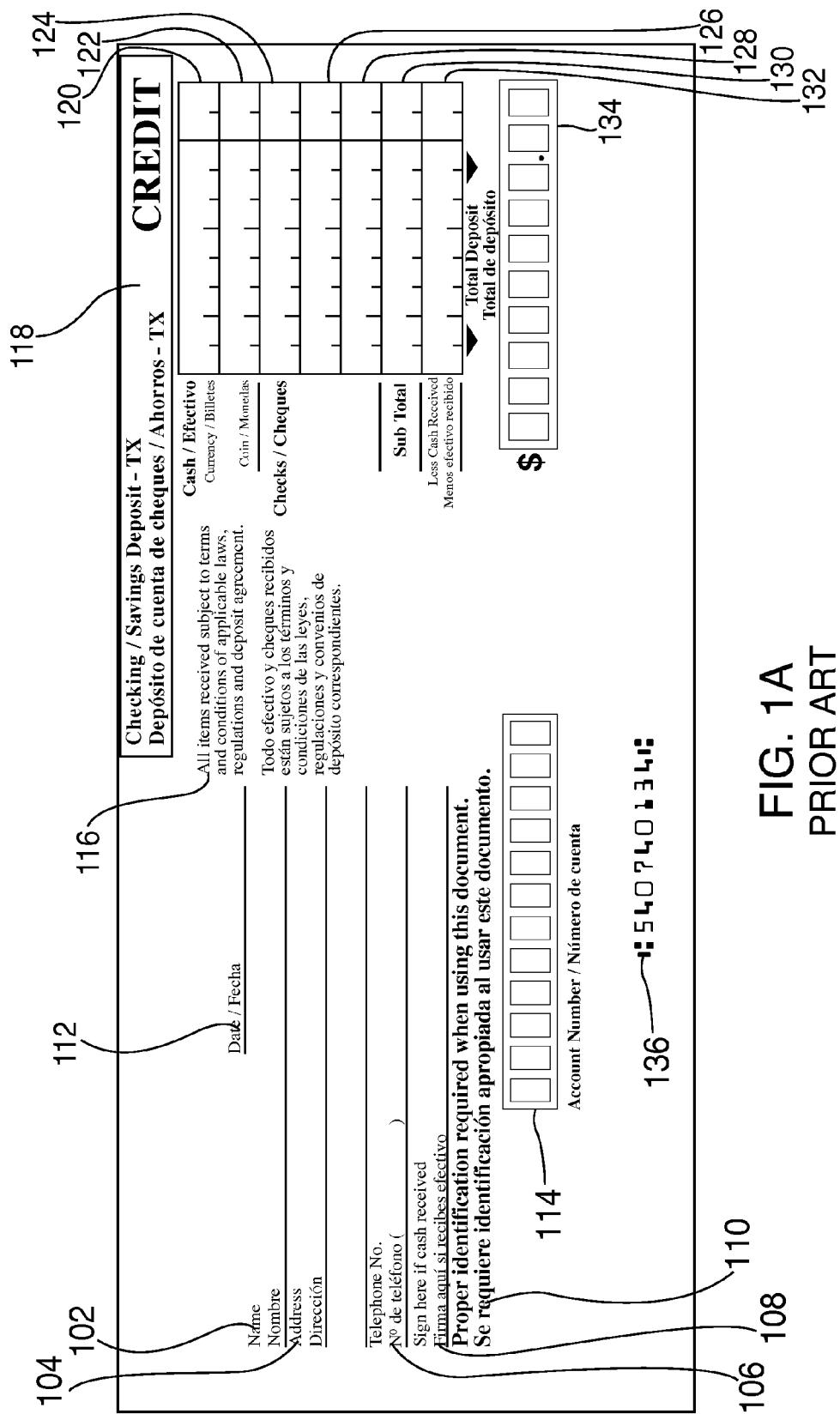

A counter deposit ticket is provided. The counter deposit ticket may be used with a financial institution teller. The counter deposit ticket may be used with an automated teller machine ("ATM").

The counter deposit ticket may include a top face. The counter deposit ticket may include a bottom face. The counter deposit ticket may also include a universal routing transit number. The universal routing transit number may be printed on the counter deposit ticket in MICR ink. The MICR ink may be printed on the top face and/or the bottom face of the ticket. The universal routing transit number may be devoid of any state of origin indication in the MICR ink. The MICR ink may include an indication of the current month. The MICR ink may include an indication of the current year. The MICR ink may include an indication of state-agnosticity.

The counter deposit ticket may also include a plurality of boxes on the top face of the ticket. The plurality of boxes may be greater than twenty-five. The plurality of boxes may be less than twenty-five. The plurality of boxes may be equal to twenty-five. The plurality of boxes may be fifty. The plurality of boxes may be equal to the amount of states in the United States of America. Each box may include the name of one of the fifty states in the United States in America. Each box may encircle a state name distinct from the other twenty-four boxes.

The counter deposit ticket may also outline or circumscribe a sub-portion of a bottom face of the counter deposit ticket (hereinafter, "portion"). The portion may be two inches by two inches square. The portion may be three inches by four inches. The portion may be any suitable size. The portion may include empty space. The portion may be designated by the legend "do not write in this area." The portion may be designated by any other suitable legend.

The portion may be offset from a vertically-oriented midline of the bottom face of the ticket, such that the portion does not contact the midline. The portion may be offset to the right side of the midline. The right side may be determined with respect to a depositor viewing the bottom face in an upright position. The portion may be offset to the left side of the midline. The left side may be determined with respect to a depositor viewing the bottom face in an upright position.

In some embodiments, the MICR ink may include an indication to process a deposit associated with the counter deposit ticket. The deposit may include a check. The check may include a check account number, a check routing transit number, a check number and any other suitable information. The financial institution may be enabled to retrieve funds associated with the check upon receipt of the counter deposit ticket and deposit items and prior to attempting to retrieve state of origin information associated with the counter deposit ticket and/or deposit items.

A method for retrieving information from the counter deposit ticket may also be provided. The method may include an ATM or a teller receiving the counter deposit ticket. The method may also include a reader/sorter identifying the routing transit number from the MICR ink on the counter deposit ticket. The method may also include determining that the routing transit number is state agnostic.

The method may also include transmitting an electronic instruction to a database. The electronic instruction may request identification of a state of origin associated with an account number on the counter deposit ticket. The method may include receiving an electronic message from the database. The electronic message may include the account number and/or the state of origin. The method may include printing the state of origin on the counter deposit ticket. The method may include presenting a message to a depositor that the counter deposit ticket was accepted.

The method may also include receiving a check together with the counter deposit ticket. The method may also include identifying, via OCR software, a check amount, check routing number, check account number and check number from the check. The method may also include transmitting an electronic funds request to a second financial institution prior to transmitting the electronic instruction. The second financial institution may be associated with the check routing transit number. The electronic funds request may include the check amount, the check routing number, the check account number and the check number. The method may also include receiving the funds from the second financial institution. The method may also include transmitting the funds from a drawing institution identified on the deposit and/or deposit items to a financial account specified on the counter deposit ticket.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIGS. 1A and 1B show a prior art counter deposit ticket. FIG. 1A shows the top face and FIG. 1B shows the bottom face. It should be appreciated that most of text included on the counter deposit ticket is written in the English language as well as in the Spanish language. It should be appreciated that text may be written in any other suitable language which may be understood by a depositor.

The counter deposit ticket may include name line 102. A user of the counter deposit ticket may write his or her name on name line 102. The counter deposit ticket may also include address lines 104. A user of the counter deposit ticket may write his or her address on address line 104. The counter deposit ticket may also include telephone number line 106. A user of the counter deposit ticket may write his or her telephone number on telephone number line 106.

The counter deposit ticket may also include text 110. Text 110 may inform the user that proper identification is required when using this document. The counter deposit ticket may also include account number entry boxes 114. A user may write his or her account number into account number entry boxes 114. Each box included in account number entry boxes 114 may accommodate one number.

The counter deposit ticket may also include text 116. Text 116 may inform a depositor that all items received may be subject to terms and conditions of applicable laws, regulations and deposit agreements.

The counter deposit ticket may also include box 118. Box 118 may inform a depositor that this ticket is to be used for credits in either checking or savings account. Box 118 also includes the abbreviation—"TX". The abbreviation "TX" may indicate that the counter deposit ticket may be for use specifically in Texas.

The counter deposit ticket may also include number entry boxes 120, 122, 124, 126, 128, 130, 132 and 134. A user of the counter deposit ticket may write an amount of cash he or she is depositing in number entry box 120. A user of the counter deposit ticket may also write an amount of coins he or she is depositing in number entry box 122. A user of the counter deposit ticket may write an amount of a check he or she is depositing in number entry box 124, 126 and 128. A user may write a subtotal of number entry boxes 120, 122, 124, 126, and 128 into subtotal box 130.

At times, a depositor may have more than three checks to deposit. Therefore, underside of the counter deposit ticket may include table 142. Table 142 may include column 138—dollars and column 140—cents. The depositor may write each check amount in one row. The depositor may add up the amounts written and write the total amount in box 144. The counter deposit ticket informs the depositor to enter this total on the front of the ticket, as shown at 146. The depositor may then incorporate the amount written in box 144 into subtotal box 130. The depositor may incorporate the amount written in box 144 onto the front of the counter deposit ticket in any suitable manner.

At times a depositor may request cash back from the deposit. Number entry box 132 enables a depositor to write an amount of cash requested from the deposit. Number entry box 134 may be the total amount being deposited into the account referenced by account number entry box 114. The amount written in number entry box 134 may be the amount written in subtotal box 130 minus the amount written in cash requested box 132. A depositor may be required to sign line 108 when receiving cash back from a deposit.

The counter deposit ticket may include a MICR line, as shown at 136. The characters printed on the MICR line may be printed in magnetic ink. The magnetic ink may include a metallic component, such as ferrous oxide. Initially, when the counter deposit ticket is passed through a reader/sorter, which extracts information from the counter deposit ticket, the ink may be magnetized. After magnetization, the reader/sorter measures the magnetic signal waveform or pattern of the MICR characters as the counter deposit ticket passes through the reader/sorter. The signal is compared against identified waveforms of the MICR character set to determine which character was read.

Conventionally, the MICR ink included a state identifying routing transit number. The state identifying routing transit number identified the state of origin of the deposit. It was necessary, though, that the state of origin of the deposit matched the state of origin of the depositor's account. A depositor who attempted to use a counter deposit ticket in a state different from the state he or she opened his or her bank account was unable to complete the deposit. An ATM or financial institution teller informed the depositor that the counter deposit ticket he or she was using was ineffective. Therefore, the depositor was compelled to fill out a new out-of-state counter deposit ticket to complete the deposit process.

The MICR characters shown at 136 may include a specific state routing transit number.

Figure 2A:
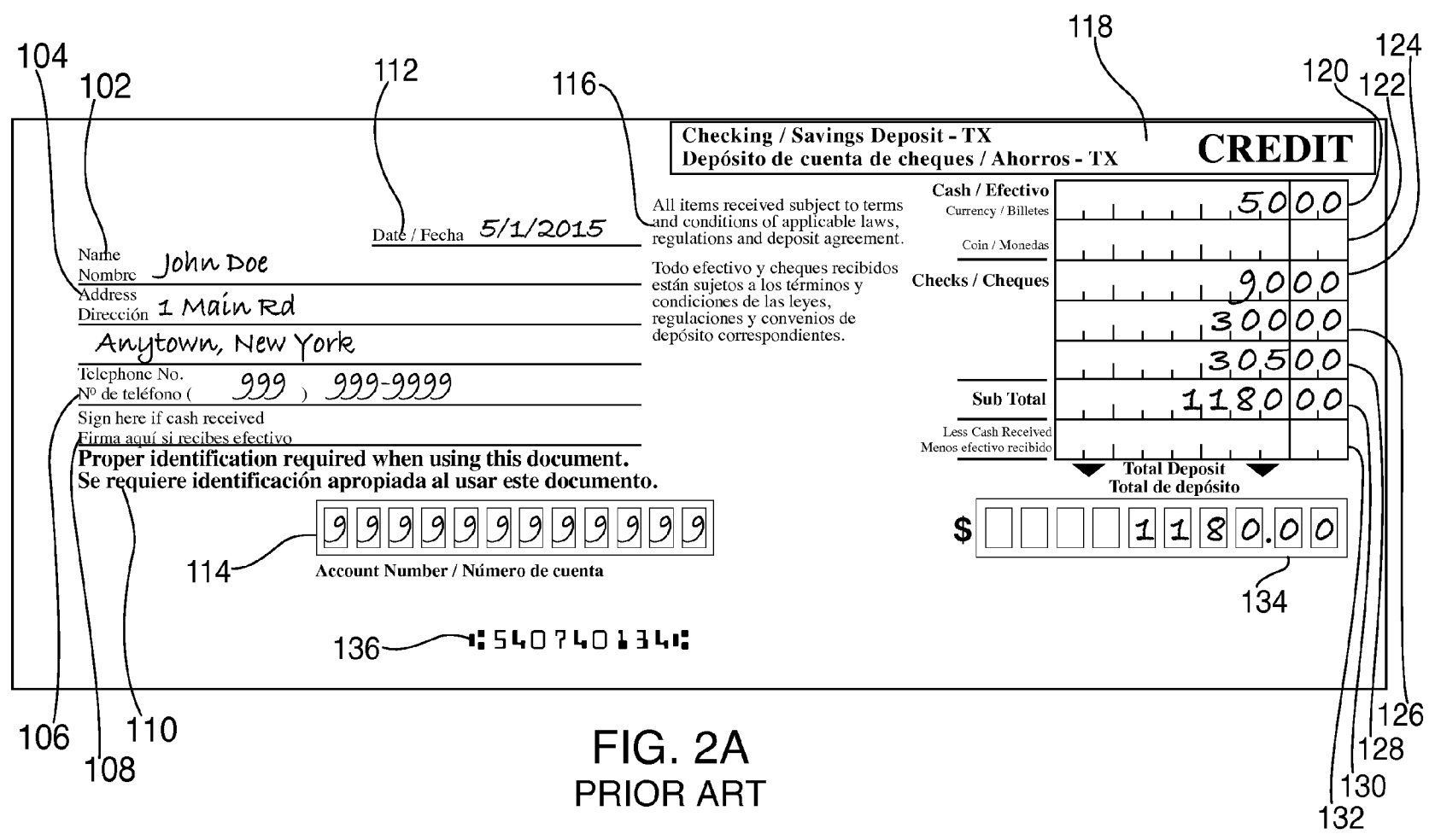
Figure 2B:
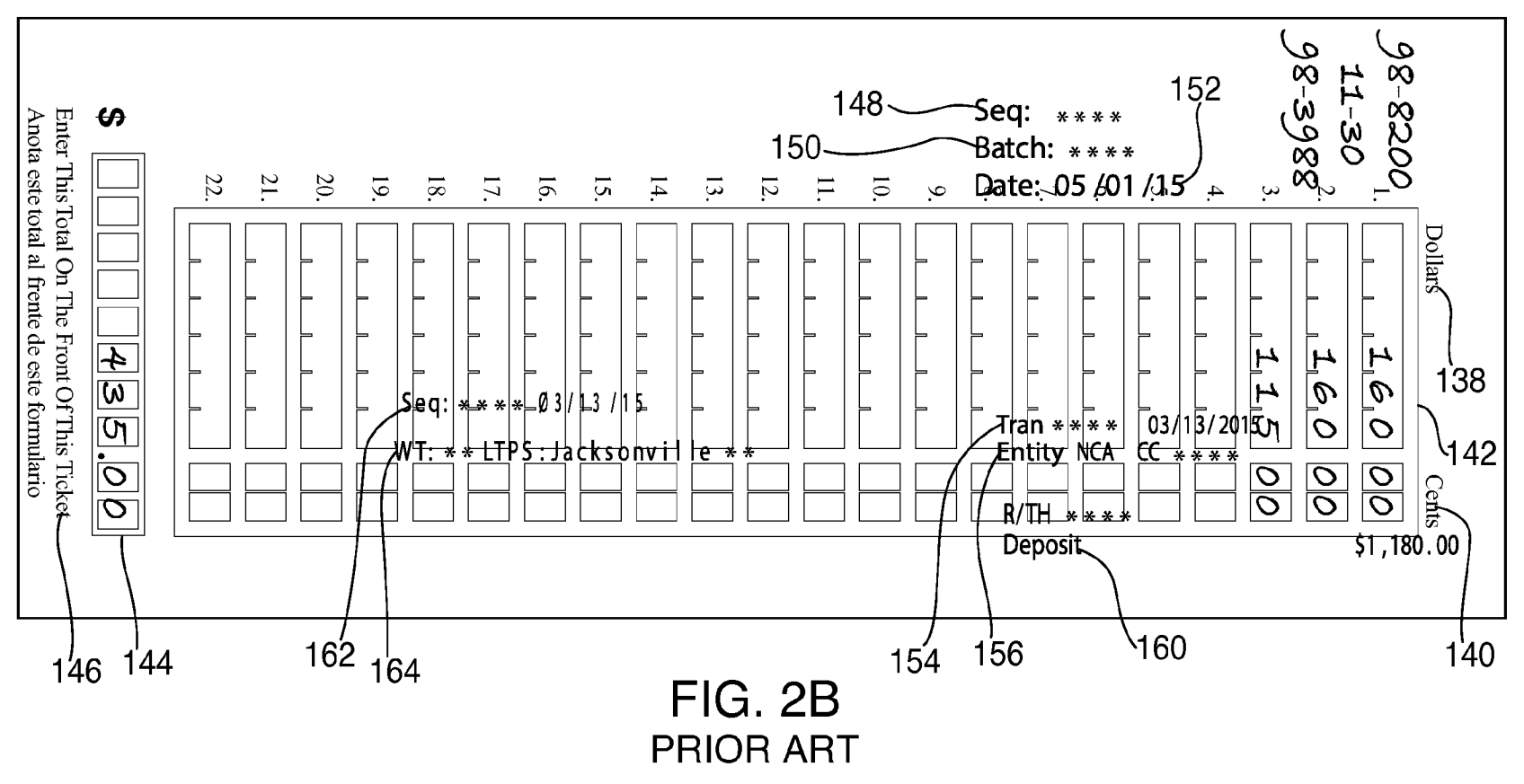

FIGS. 2A and 2B show the prior art counter deposit ticket of FIGS. 1A and 1B, filled-in by a depositor. The depositor may have written the fictional name John Doe on line 102. The depositor may have written the fictional address "1 Main Street, Anytown, New York" on lines 104. The depositor may have written fictional phone number "999-999-9999" on line 106. The depositor may have entered fictional account number "999999999999" into boxes 114.

The depositor may have entered fifty dollars into box 120. The depositor may have entered ninety dollars into box 124, three hundred dollars into box 126 and three hundred and five dollars into box 128. The depositor may have entered one hundred and sixty dollars into the row one in table 142. The depositor may have entered one hundred and sixty dollars into row two in table 142. The depositor may have entered one hundred and fifteen dollars into row three in table 142. The total of rows one, two and three in table 142 may be four hundred and thirty five dollars as shown at 144. The deposit subtotal may be one thousand one hundred and eighty dollars as shown at 130. The depositor may not have requested cash back, as indicated by empty box 132. The total deposit may be one thousand one hundred and eighty dollars, as shown at box 134.

The counter deposit ticket may be processed upon the transfer of the counter deposit ticket to the financial institution teller or automatic teller machine. During the processing, information may be typed onto portions of the counter deposit ticket. As shown on the underside of the counter deposit ticket, text 148, 150, 152, 154, 156, 158, 160, 162 and 164 may be printed on the ticket. Text 148 may show the sequence number of a transaction associated with the counter deposit ticket. Text 150 may show the batch number of the transaction. Text 152 may show the date of the transaction. Text 154 may show the transit number of the transaction. Text 156 may show the entity associated with the transaction. Text 158 may show the routing transit number associated with the transaction. Text 160 may show the type of the transaction, e.g. deposit, withdrawal, transfer, etc. Text 162 may show the sequence number of the transaction. Text 164 may show the transaction processing center associated with the transaction.

At times, the text printed on the underside of the counter deposit ticket may render the underlying text, written in table 142, illegible. Also, sometimes, the text itself may be undecipherable because of numbers handwritten written into table 142.

Figure 3A:
FIGS. 3A and 3B show a prior art counter deposit ticket.
Figure 3B:
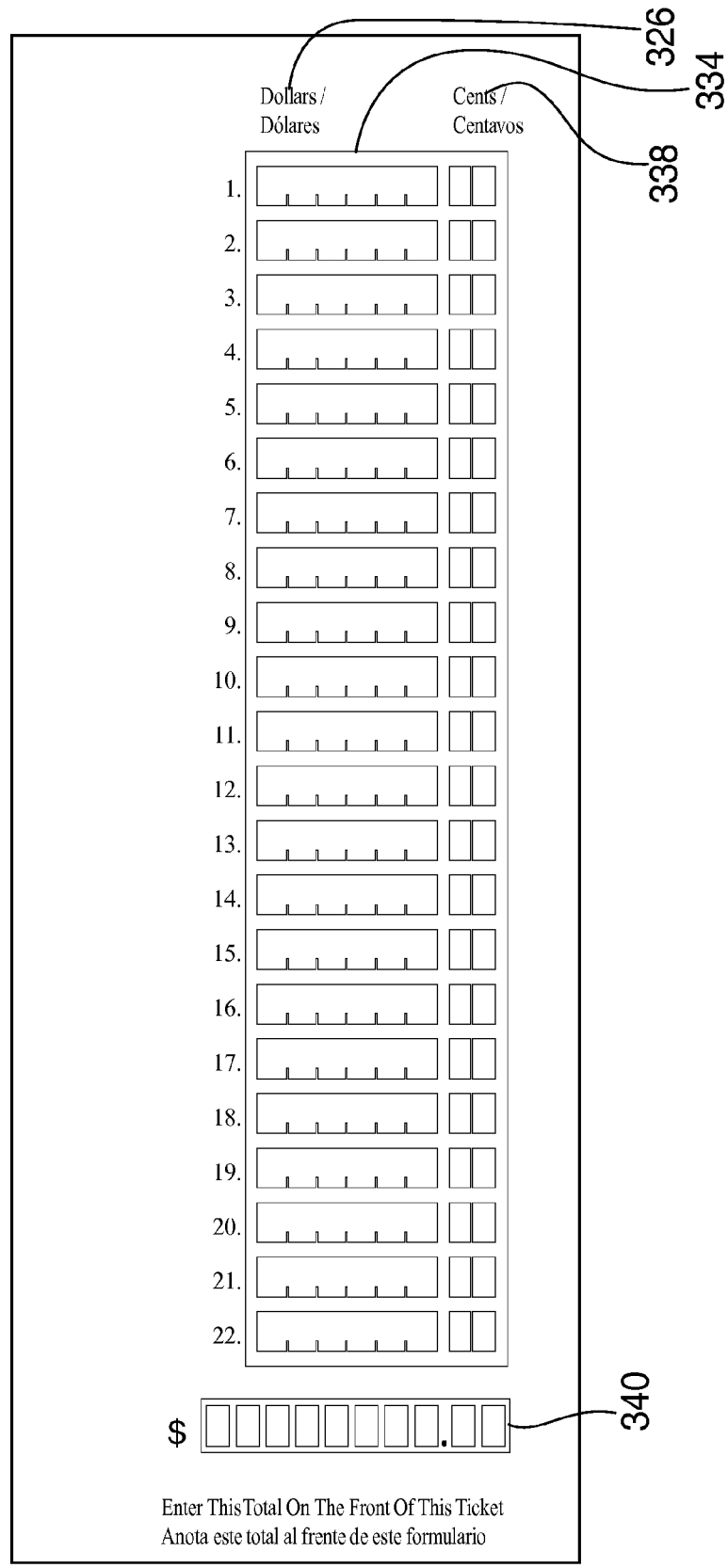

FIGS. 3A and 3B shows a prior art out-of-state counter deposit ticket. FIG. 3A shows the top face of the counter deposit ticket. FIG. 3B shows the bottom face of the counter deposit ticket. In the event that a depositor wishes to make a deposit in a state other than the state in which he or she opened his or her account, a depositor may be required to utilize out-of-state counter deposit ticket 300. Out-of-state counter deposit ticket 300 may include shaded portion 302. Shaded portion 302 may include several different boxes. Each box may include the name of a state, the initials associated with the state and a two digit number code associated with the state. For example, box 303 may include the name of a state—Florida, the initials associated with the state—"FL" and a two digit number code associated with the state—"79".

Shaded portion 302 may also include instructions 305. Instructions 305 may be instructions for a financial institution teller how to properly fill out counter deposit ticket 300. Instructions 305 may include instruction number one— "Verify the customer name and account number on-line." Instruction one may direct a teller to ensure that the customer name matches the account number on the teller's computer system.

Instructions 305 may include instruction number two— "Mark the State Code for the domicile state/entity of the account". Instruction two may direct a teller upon viewing the account on the computer system to identify the domicile state of the account. Upon identification of the domicile state, the teller may mark the state box associated with the domicile state in shaded portion 302.

Instructions 305 may also include instruction number three—"Write the 2-digit number in the Proof Code box below." Instruction three may direct a teller to write the two digit number code associated with the state in proof code box 318.

Out-of-state counter deposit ticket 300 may include name line 304. A user of counter deposit ticket 300 may write his or her name on name line 304. Out-of-state counter deposit ticket 300 may also include address line 306. A depositor of out-of-state counter deposit ticket 300 may write his or her name of address line 306. Out-of-state counter deposit ticket 300 may also include city/state/zip line 308. A user of out-of-state counter deposit ticket 300 may write his or her city, state and zip code on city/state/zip line 308. Out-ofstate counter deposit ticket 300 may also include telephone line 314. A user of out-of-state counter deposit ticket 300 may write his or her telephone number on telephone line 314. Out-of-state counter deposit ticket 300 may also include date line 312. A user of out-of-state counter deposit ticket 300 may write the date on date line 312.

Out-of-state counter deposit ticket 300 may include location/store/serial number entry boxes 316. Location/store/serial number entry boxes 316 may be used by business customers only, as indicated in the text above boxes 316. A business depositor may enter the location, store or serial number of the entity with which he or she is associated, as set forth in boxes 316.

Out-of-state counter deposit ticket 300 may also include account number entry boxes 320. A user may enter his or her account number into account entry boxes 320.

Out-of-state counter deposit ticket 300 may include cash entry boxes 322. A depositor may enter the amount of cash he or she is depositing, as set forth in boxes 322. Out-of-state counter deposit ticket 300 may include check entry boxes 324 and 326. A depositor may enter, into either of boxes 324 or boxes 326, an amount of a check that he or she is depositing.

In the event that the depositor wishes to deposit more than two checks, the depositor may utilize the underside of counter deposit ticket 300. The underside (previously referred to as bottom face but also referred to herein in the alternative as "underside") of counter deposit ticket 300 may include table 334. Table 334 may include column 336—dollars and column 338—cents. Table 334 may also include rows one through twenty-two. A depositor may enter an amount of check on each of rows one through twenty-two. The total amount of the checks written in table 334 may be written in boxes 340. The out-of-state counter deposit ticket may indicate that the total written in boxes 340 should be entered on the front of the counter deposit ticket.

Out-of-state counter deposit ticket 300 may also include subtotal boxes 328. A depositor of counter deposit ticket 300 may enter the subtotal of the checks and cash into boxes 328. A depositor requesting cash back from the deposit may write the amount of cash desired in boxes 330. The total deposit may be entered in boxes 332. The total deposit may be the subtotal amount, written in boxes 328, minus the cash back amount, written in boxes 330.

Figure 4B:
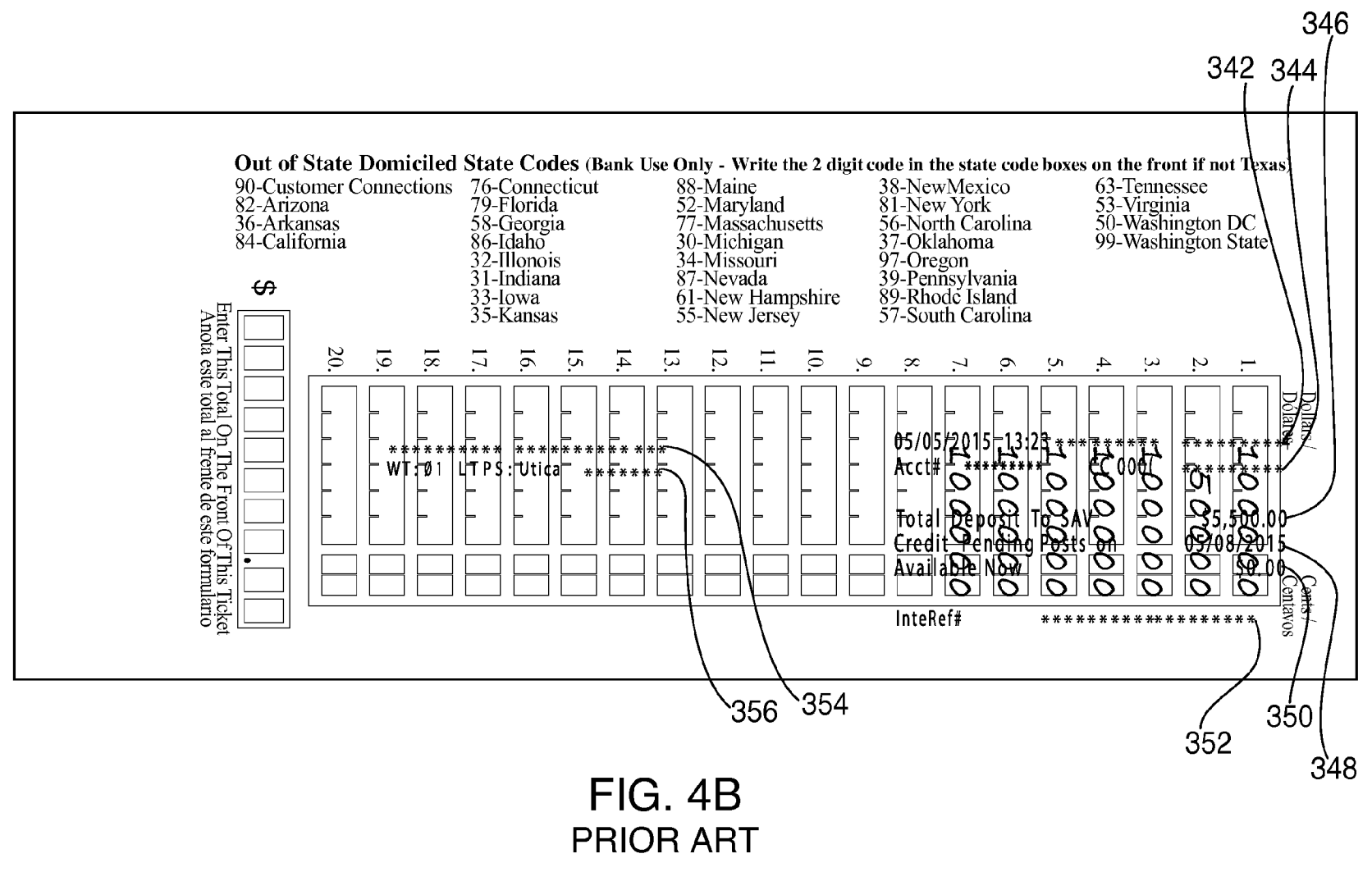

FIGS. 4A and 4B show the prior out-of-state counter deposit ticket 300 (shown in FIGS. 3A and 3B) filled in. A user may have entered fictional name "John Doe" onto name line 304. The user may have entered fictional address "1 Main Street" onto address line 306. The user may have entered fictional city—Anytown, state—New York and zip code—99999 onto city/state/zip line 308. The user may have entered fictional account number—"123456789000" into account number boxes 320. The financial teller receiving the counter deposit ticket may have marked New York, as shown at 307. The financial teller receiving the counter deposit ticket may have also written the number "81" into proof code boxes 318.

The depositor may have deposited seven checks together with counter deposit ticket 300. Therefore, the depositor may have written seven check amounts into table 334 on the underside of counter deposit ticket 300. The depositor may have also written the total of the checks, $6500.00 into boxes 340 on the underside of the counter deposit ticket. The depositor may have also written the total of $6500.00 into the subtotal boxes 328 on the front face of the counter deposit ticket. The depositor may have also written the total of $6500.00 into total deposit boxes 332.

Counter deposit ticket 300 may be processed upon the transfer of the counter deposit ticket to a financial institution teller or ATM. During the processing, information may be printed on counter deposit ticket 300, as shown on the underside of counter deposit ticket 300, in FIG. 4. Text 342, 344, 346, 348, 350, 352, 354 and 356 may be printed on the underside of counter deposit ticket 300. Text 342 may show the timestamp of a transaction associated with counter deposit ticket 300. Text 344 may show an account number and other information associated with the transaction. Text 346 may show the total deposit amount as well as the type of account associated with the transaction. Text 348 may show the posting date of the transaction. Text 352 may show the internal reference number or transaction identifier associated with the transaction. Transaction identifiers are discussed in co-pending, commonly-assigned application Ser. No. 14/632,561 filed on Feb. 26, 2015, which is hereby incorporated by reference herein in its entirety. Text 354 may show additional information regarding the transaction. Text 356 may show the processing location of the transaction.

At times, the text printed on the underside of the counter deposit ticket may render the underlying text, written in table 334, illegible. Sometimes, the text itself may be undecipherable because of numbers handwritten into table 334.

FIGS. 5A, 5B, 5C, 5D, 5E, 5F and 5G each show different views of state-agnostic universal counter deposit ticket 500 according to several embodiments. A depositor may be able to utilize state-agnostic universal counter deposit ticket 500 in any location regardless of his or her domicile state. In addition, there may be a "do not write" portion on the bottom face of the universal deposit ticket. The "do not write" portion on the bottom face of state-agnostic universal counter deposit ticket 500 may enable an entity to print information on the bottom face of the ticket without overwriting type or handwriting already on the ticket.

Figure 5A:
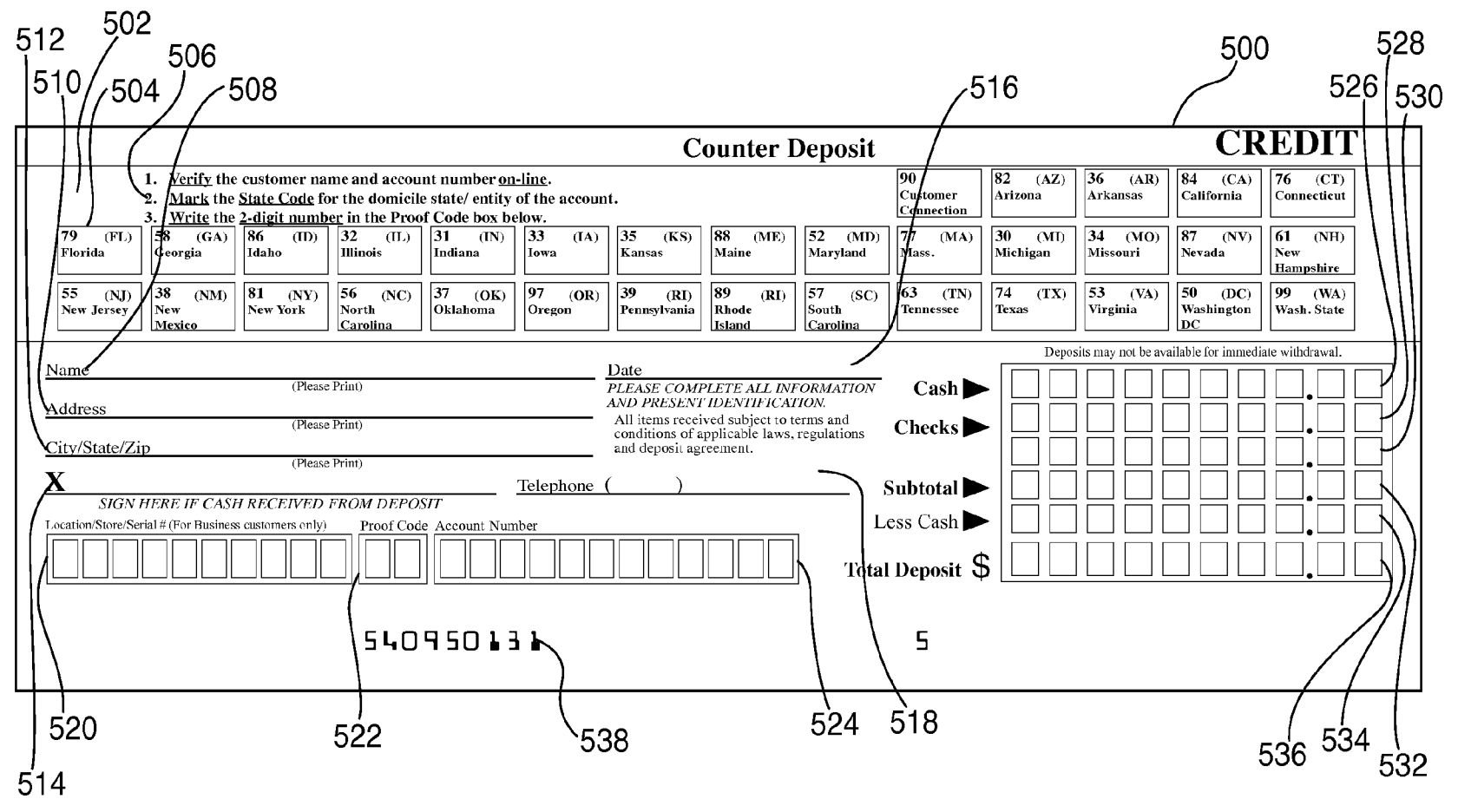

FIG. 5A shows a top face of a state-agnostic universal counter deposit ticket 500. State-agnostic universal counter deposit ticket 500 may include state portion 502. State portion 502 may include a plurality of boxes. Each box may include a state name, state code and/or state abbreviation. For example, state box 504 shows the state name Florida, the state code "79" and the state abbreviation "FL".

State-agnostic universal counter deposit ticket 500 may also include lines and boxes where a user may enter his or her personal account and deposit information. State-agnostic universal counter deposit ticket 500 may include name line 508. A user may enter his or her name on name line 508. State-agnostic universal counter deposit ticket 500 may include address line 510. A user may enter his or her address on address line 510. State-agnostic universal counter deposit ticket 500 may include city/state/zip line 512. A user may enter his or her city, state and zip code on city/state/zip line 512. State-agnostic universal counter deposit ticket 500 may include date line 516. A user may enter the date on date line 516. State-agnostic universal counter deposit ticket 500 may include telephone line 518. A user may enter his or her telephone on telephone line 518.

State-agnostic universal counter deposit ticket 500 may also include cash amount entry boxes 526. A depositor may enter an amount of cash he or she intends to deposit in cash number entry boxes 526. State-agnostic universal counter deposit ticket 500 may also include checks amount entry boxes 528 and 530. A depositor may enter a check amount into check entry box 528 and check entry box 530. State-agnostic universal counter deposit ticket 500 may include subtotal entry box 532. A depositor may enter a subtotal of the checks and cash he wishes to deposit in subtotal entry box 532. State-agnostic universal counter deposit ticket 500 may also include less cash entry box 534. A depositor may enter an amount of cash back he would like to receive from the deposit in less cash entry box 534. State-agnostic universal counter deposit ticket 500 may also include total deposit amount boxes 536. The amount written in total deposit amount boxes 536 may be the amount written in subtotal boxes 532 minus the amount written in less cash boxes 534.

State-agnostic universal counter deposit ticket 500 may also include signature line 514. A depositor may be required to sign on signature line 514 when he receives cash back from the deposit.

State-agnostic universal counter deposit ticket 500 may also include location/store/serial number boxes 520. A business depositor may enter his or her location, store and/or serial number into boxes 520. Alongside location/store/serial number boxes may be proof code boxes 522. A teller or a depositor may enter the state code of the domicile state associated with the account in proof code boxes 522. Alongside proof code boxes 522 may be account number boxes 524. A depositor or teller may enter an account number into account number boxes 524.

State-agnostic universal counter deposit ticket 500 may include MICR line 538. MICR line 538 may be printed in magnetic ink. The magnetic ink may include a magnetic component, such as ferrous oxide. Initially, when the counter deposit ticket is passed through a reader/sorter, which extracts information from the counter deposit ticket, the ink is magnetized. After magnetization, the reader/sorter measures the magnetic signal waveform or pattern of the MICR characters as the counter deposit ticket passes through the reader/sorter. The signal is compared against identified waveforms of the MICR character set to determine which character was read. The MICR line may also be read via OCR software.

MICR line 538 may have various benefits over regular ink. One benefit of MICR line 538 may be that MICR line 538 may be read, via a reader/sorter, even when a user writes on top of the MICR line. This may not be so when using OCR (optical character recognition) software.

MICR line 538 may also include a state-agnostic routing transit number. Specifically, the MICR line may be magnetized to indicate that this ticket is a state-agnostic universal counter deposit ticket. The magnetic read may identify a routing transit number with state-agnosticity. The routing transit number may be different from the routing transit number associated with any particular state. The routing transit number may indicate that this counter deposit ticket may be used regardless of the domicile state of the account holder. The domicile state of the account holder may be state in which the account holder resides. The domicile state of the account holder may be the state in which the account holder opened up his or her account.

When a depositor transfers counter deposit ticket 500 to a teller or ATM, the teller or ATM may retrieve domicile state information associated with the account number. The state-lookup may occur before the deposit transaction, associated with counter deposit ticket 500, is sent for processing. The state-lookup may occur after the deposit transaction, associated with counter deposit ticket 500, is sent for processing.

Figure 5B:
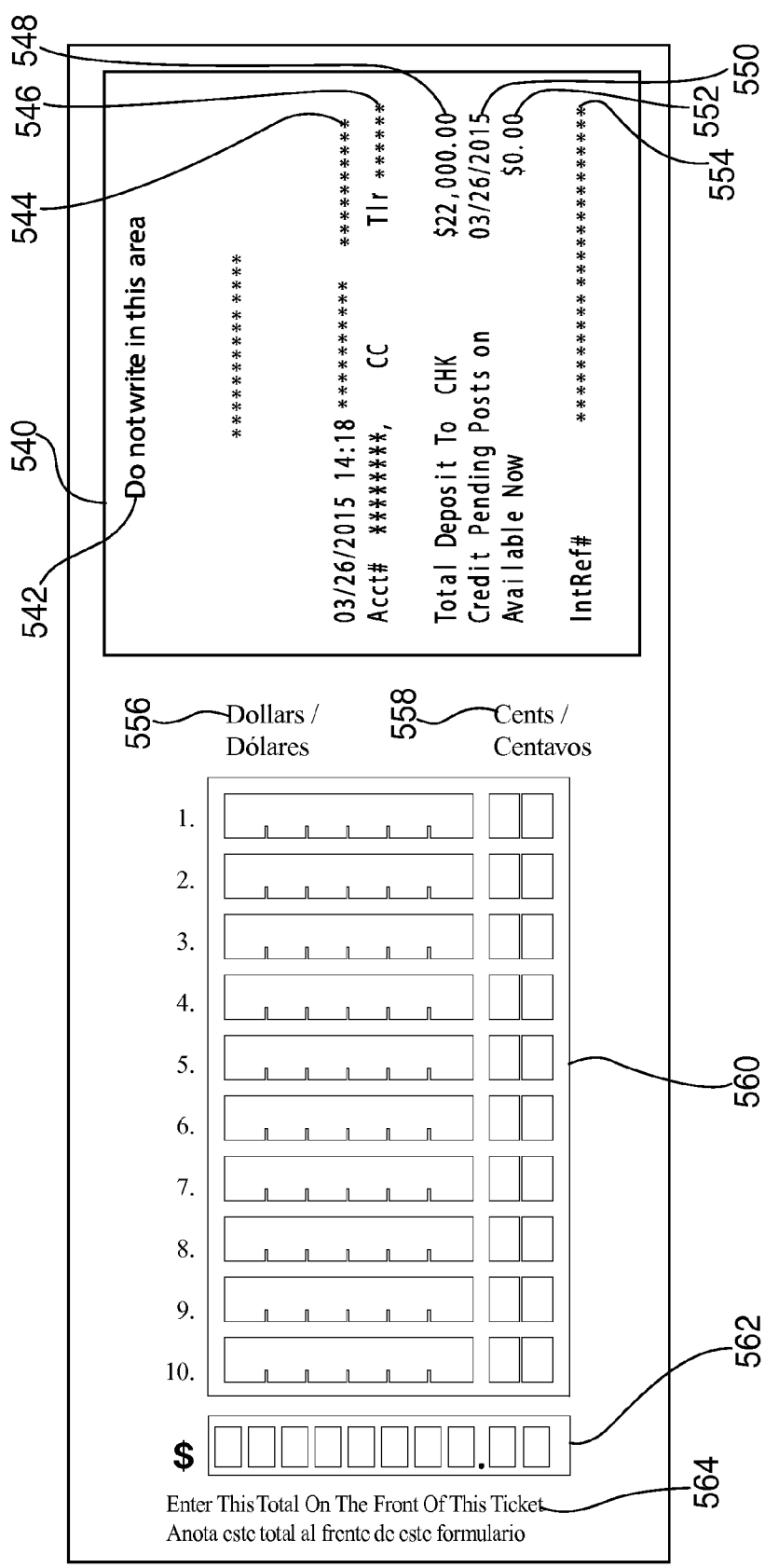

FIG. 5B shows an underside of counter deposit ticket 500. The bottom face may include table 560. Table 560 may enable a depositor to enter additional checks into rows one through ten. Table 560 may be divided into dollars column 556 and cents column 558. The total of table 560 may be written in total boxes 562. Counter deposit ticket 500 may instruct a depositor to enter the total from boxes 562 onto the face of ticket 500, as shown at 564.

The bottom face of counter deposit ticket 500 may also include box 540. Box 540 may indicate not to write in the area, as shown at 542. Box 540 may enable an entity to print information on counter deposit ticket without interfering with the depositor's handwriting. Box 540 may enable an entity to use OCR software to read information printed on the bottom face of counter deposit ticket 500.

In FIG. 5B, Box 540 includes exemplary fictional information which may have been printed by an entity. Line 544 shows date and time information which may the receipt date of counter deposit ticket 500. Line 546 shows account number, teller and branch information of the deposit associated with counter deposit ticket 500. Line 548 shows the amount of the deposit (22,000.00). Line 548 also shows into which account (checking) the funds are placed. Line 550 shows the date the funds will appear in the account. Line 552 shows the amount of funds from the deposit available (0.00). Line 554 shows the internal reference number of the transaction, which has been discussed in co-pending application commonly-assigned application Ser. No. 14/632,561.

FIG. 5C shows an embodiment of the underside of counter deposit ticket 500. The embodiment shows in FIG. 5C is similar to that shown in FIG. 5B, except the portion designated as "do not write in this area" is positioned on the left side of ticket 500, as shown at 566, and table 568 is positioned on the right side of ticket 500.

Figure 5D:
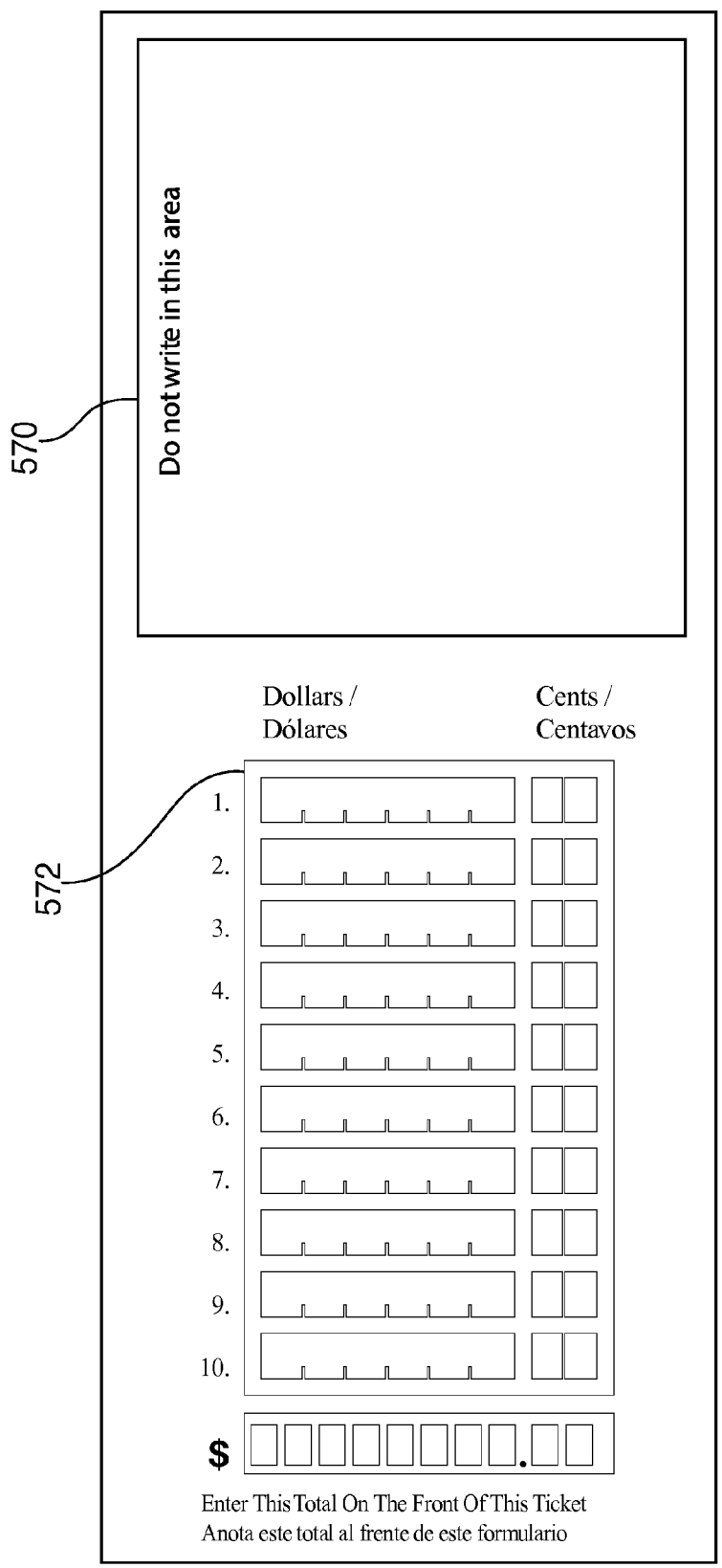

FIG. 5D shows an embodiment of the underside of counter deposit ticket 500. The embodiment shown in FIG. 5D is similar to that shown in FIG. 5B, except the portion 570 designated as "do not write in this area" is shown without information printed inside the portion. In FIG. 5D, portion 570 is shown on the right side, while table 572 is shown on the left side.

FIG. 5E shows an embodiment of the back view of counter deposit ticket 500. The embodiment shown in FIG. 5E is similar to that shown in FIG. 5C, except the portion 576, designated as "do not write in this area" is shown without information printed inside portion 576. In FIG. 5E, table 572 is positioned on the right side, while portion 576 is positioned on the left side.

Figure 5F:
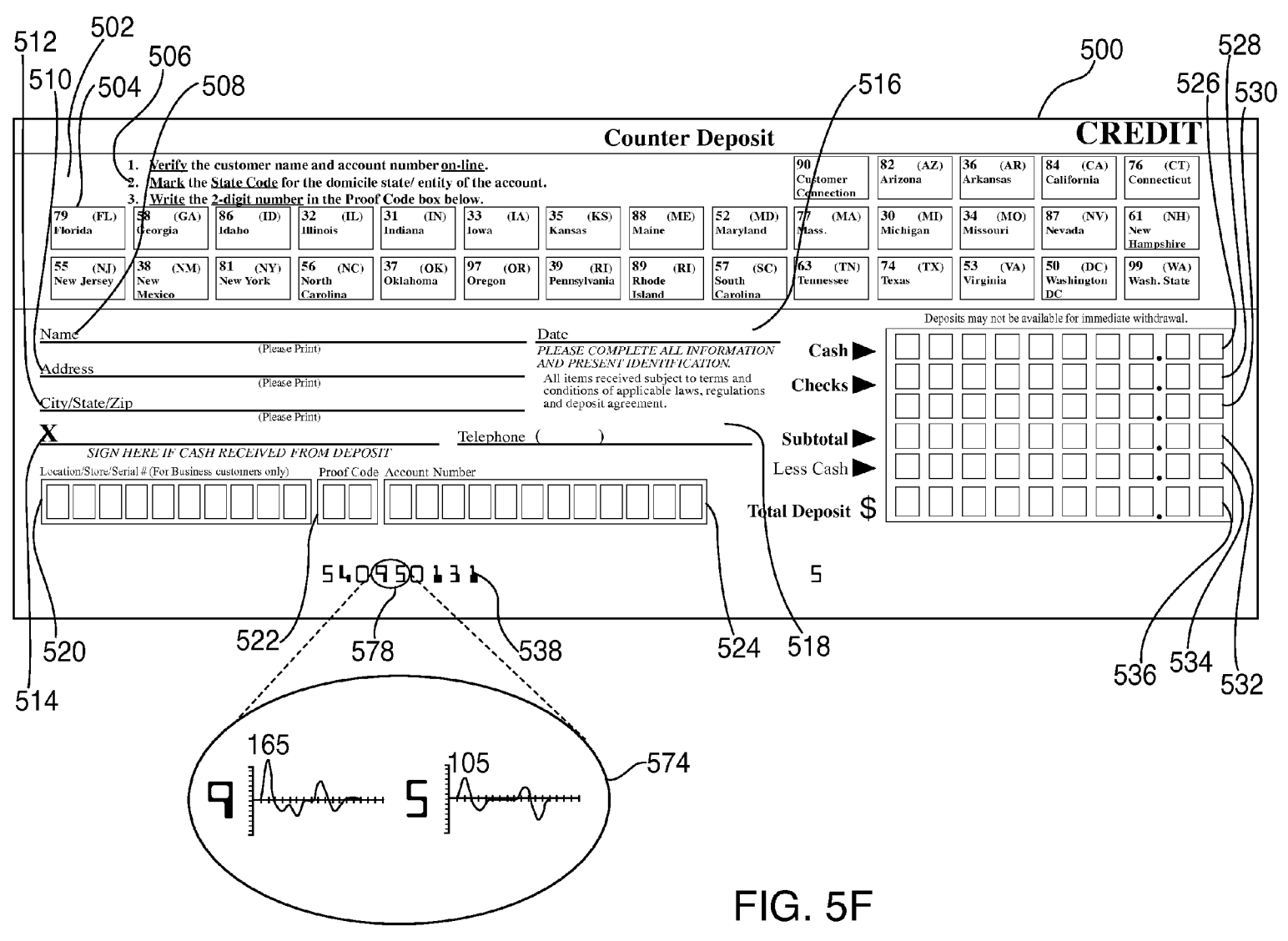

FIG. 5F shows an exploded view of the MICR line shown in FIG. 5A. MICR line 538 may include MICR characters—"95", as shown at 578. MICR characters "95" may produce a waveform, as shown at 574. Character 9 may produce a peak of 165, while character 5 may produce a peak of 105. Upon magnetization, the MICR line may include, at least in part, a waveform similar to that shown at 574. The system may recognize the waveforms to be universal waveforms. The system may then process the counter deposit ticket as a universal state-agnostic counter deposit ticket.

Figure 5G:

FIG. 5G shows another embodiment of a top face of counter deposit ticket 500. In FIG. 5G, the plurality of boxes are shown inside section 580. Each box inside section 580 may include a state abbreviation and a state code. For example, box 585 may include the state initials "FL", the state code 79 and a checkbox. A depositor may place a mark inside the checkbox to indicate his or her domicile state.

Figure 6:
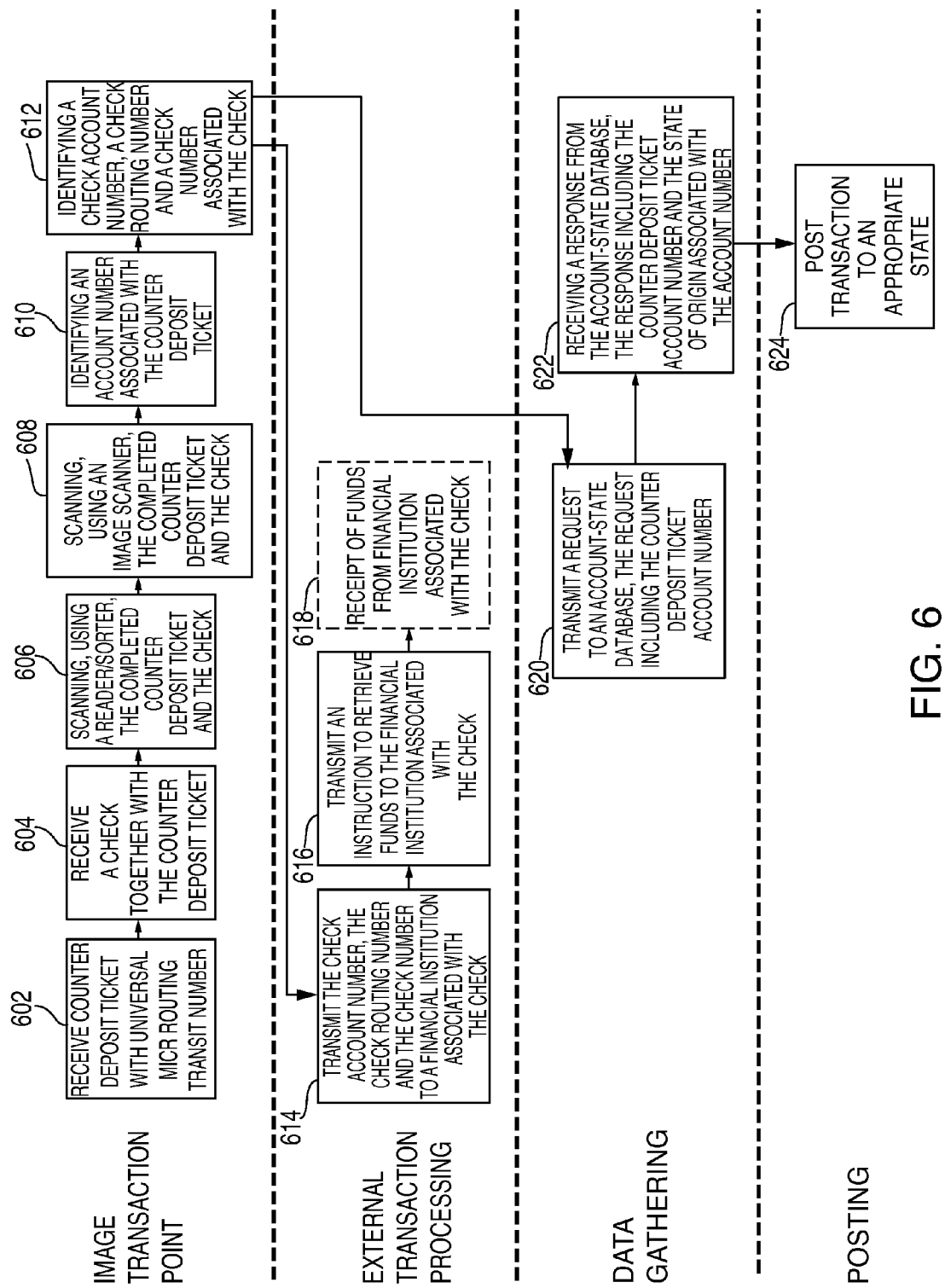
FIG. 6 shows an illustrative flow chart of an embodiment of the invention.

FIG. 6 shows an illustrative flow chart. Step 602 shows receiving, at an image transaction point, a counter deposit ticket with universal MICR routing transit number. The image transaction point may be an ATM, financial institution teller, deposit application on a smartphone or at any other suitable transaction point. Step 604 shows receiving a check together with the counter deposit ticket at the image transaction point. Step 606 shows scanning, using a reader/sorter the completed counter deposit ticket and the check at the image transaction point. Step 608 shows scanning, using an image scanner, the completed counter deposit ticket and the check. It should be appreciated that steps 606 and 608 may occur simultaneously. It should also be appreciated that step 608 may come before step 606.

Step 610 shows identifying an account number associated with the counter deposit ticket. Step 612 shows identifying a check account number, a check routing number and a check number associated with the check. It should be appreciated that the system can perform either the external transaction processing or the data gathering after step 612, as shown by the two arrows coming from step 612.

Step 614 shows transmitting the check account number, the check routing number and the check number to a drawing financial institution associated with the check. Step 616 shows transmitting an instruction to retrieve funds to the financial institution associated with the check. Step 618 shows receipt of funds from the drawing financial institution associated with the check in response to the instruction to retrieve funds. Step 618 is shown in dotted lines to symbolize that this step may occur after the entire process is completed.

Step 620 shows transmitting a request to an account-state database. The request may include the counter deposit ticket account number. Step 622 shows receiving a response from the account-state database. The response may include the counter deposit ticket account number and the state of origin associated with the account number. It should be appreciated that the universal MICR routing transit number enables the system to externally process the deposit transaction prior to gathering state data. This may improve the speed of the transaction processing.

Step 624 shows posting of the transaction to the appropriate state. This may be implemented by an ATM or any other suitable hardware.

Thus, methods and apparatus for a state-agnostic counter deposit ticket have been provided. Persons skilled in the art will appreciate that the present invention can be practiced by other than the described embodiments, which are presented for purposes of illustration rather than of limitation, and that the present invention is limited only by the claims that follow.

What is claimed is:

1. A counter deposit ticket for use with a financial institution teller and an automated teller machine, said counter deposit ticket including a top face and a bottom face, said counter deposit ticket comprising:
   a universal routing transit number printed in MICR ink on the top face of the ticket, said universal routing transit number devoid of any state of origin indication in the MICR ink;
   a plurality of boxes on the top face of the ticket, said plurality greater than twenty-five, wherein each box includes the name of one of the fifty states of the United States of America, said each box holding a state name distinct from the other twenty-four box; and
   a portion at least two inches by two inches square on the bottom face of the ticket, said portion comprising empty space, said portion being designated by the legend "do not write in this area".

2. The counter deposit of claim 1, wherein the MICR ink further comprises an indication of the current month.

3. The counter deposit ticket of claim 1, wherein the MICR ink further comprises an indication of the current year.

4. The counter deposit ticket of claim 1, wherein the MICR ink further comprises an indication of state-agnostic origin.

5. The counter deposit ticket of claim 1, wherein the portion is offset from a vertically-oriented midline of the bottom face, such that the portion does not contact the midline.

6. The counter deposit ticket of claim 5, wherein the portion is offset to a right side of the midline, said right side being determined with respect to a user viewing the bottom face, said bottom face being viewed in an upright position.

7. The counter deposit ticket of claim 5, wherein the portion is offset to a left side of the midline, said left side being determined with respect to a user viewing the bottom face, said bottom face being viewed in an upright position.

8. The counter deposit ticket of claim 1, wherein the MICR ink further comprises an indication to process a deposit associated with the counter deposit ticket.

9. The counter deposit ticket of claim 8, wherein the deposit comprises at least one check, said check comprising:
   a check account number;
   a check routing transit number; and
   a check number.

10. The counter deposit ticket of claim 9, wherein the financial institution is enabled to retrieve funds associated with the check:
    upon receipt of the counter deposit ticket; and
    prior to attempting to retrieve state of origin information associated with the counter deposit ticket.

11. A method for retrieving information from a counter deposit ticket, said counter deposit ticket for use with a financial institution teller and an automated teller machine, said counter deposit ticket including a universal routing transit number printed in MICR ink on a top face of the ticket, said universal routing transit number independent of any state of origin indication in the MICR ink, said counter deposit ticket including a plurality of boxes on the top face of the ticket, said plurality of boxes greater than twenty-five, wherein each box includes the initials of one of the fifty states of the United States of America, said each box holding state initials distinct from the other twenty-four boxes, said counter deposit ticket including a portion of at least two inches by two inches square on a bottom face of the ticket, said portion comprising empty space, said portion being designated by the legend "do not write in this area", the method comprising:
    receiving, at an automated teller machine or financial institution teller, the counter deposit ticket;
    identifying, via a reader/sorter, the routing transit number from the MICR ink on the counter deposit ticket;
    determining that the routing transit number is state agnostic; and
    transmitting an electronic instruction to a database to identify a state of origin associated with an account number written on the counter deposit ticket.

12. The method of claim 11, wherein the method further comprises:
    receiving an electronic message from the database, said electronic message comprising the account number and the state of origin;
    printing the state of origin on the counter deposit ticket; and
    presenting a message to a user that the counter deposit ticket was accepted.

13. The method of claim 12, wherein the method further comprises:
- receiving a check together with the counter deposit ticket;
- identifying, via OCR (optical character recognition) software, a check amount, check routing number, check account number and check number from the check;
- transmitting, prior to transmitting the electronic instruction, an electronic funds request to an second financial institution associated with the check routing transit number, the electronic funds request comprising the check amount, the check routing number, the check account number and the check number;
- receiving the funds from the second financial institution; and
- transmitting the funds to a financial account of an entity associated with the counter deposit ticket.

14. A method for using a counter deposit ticket with a financial institution teller and an automated teller machine, said method comprising:
- printing, in MICR ink, on a top face of the counter deposit ticket, a universal routing transit number, said universal routing transit number independent of any state of origin indication in the MICR ink;
- printing, a plurality of boxes, on a top face of the ticket, said plurality greater than twenty-five, wherein each box includes the name of one of the fifty states of the United States of America, said each box holding a state name distinct from the other twenty-four boxes;
- printing, a portion at least two inches by two inches square, on a bottom face of the ticket, said portion comprising empty space, said portion being designated as "do not write in this area";
- receiving, at a financial institution teller or an automated teller machine the counter deposit ticket;
- scanning, using a reader/sorter, the completed counter deposit ticket;
- scanning, using an image scanner, the completed counter deposit ticket;
- identifying, via the router/sorter, the universal routing transit number printed in MICR ink;
- identifying an account number associated with the counter deposit ticket;
- processing a deposit transaction associated with the counter deposit ticket;
- transmitting a request to an account-state database, said request comprising the account number associated with the deposit transaction; and
- receiving a response, from the account-state database, said response comprising the account number and a state of origin associated with the account number.

15. The method of claim 14, wherein the account number is printed in MICR ink on the counter deposit ticket.

16. The method of claim 14, wherein the account-state database is located at a different location from the reader/sorter and the image scanner.

17. The method of claim 14, wherein the identifying of the account number is performed by the image scanner.

* * * * *